United States Patent
Carbune et al.

(10) Patent No.: US 12,347,420 B2
(45) Date of Patent: Jul. 1, 2025

(54) PROCESSING CONTINUED CONVERSATIONS OVER MULTIPLE DEVICES

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 199 days.

(21) Appl. No.: 17/967,183

(22) Filed: Oct. 17, 2022

(65) Prior Publication Data
US 2024/0127799 A1   Apr. 18, 2024

(51) Int. Cl.
*G10L 25/60* (2013.01)
*G10L 15/08* (2006.01)
*G10L 25/78* (2013.01)

(52) U.S. Cl.
CPC .............. *G10L 15/08* (2013.01); *G10L 25/78* (2013.01)

(58) Field of Classification Search
CPC ......... G10L 17/00; G10L 15/22; G10L 25/78; G10L 15/08; G10L 15/30; G10L 2015/223; G10L 17/22; G06F 3/167
USPC ........................................................ 704/200
See application file for complete search history.

(56) References Cited

U.S. PATENT DOCUMENTS

| | | | |
|---|---|---|---|
| 2016/0155443 A1 | 6/2016 | Khan et al. | |
| 2019/0378519 A1* | 12/2019 | Dunjic | G10L 17/00 |
| 2020/0272690 A1 | 8/2020 | Howard | |
| 2021/0090572 A1* | 3/2021 | Mahmood | G10L 15/22 |
| 2021/0097982 A1 | 4/2021 | Nowak-Przygodzki | |
| 2022/0068271 A1 | 3/2022 | Berg et al. | |
| 2023/0410789 A1* | 12/2023 | Sharma | G10L 17/00 |

OTHER PUBLICATIONS

European Patent Office; International Search Report and Written Opinion issued in Application No. PCT/US2023/035234; 12 pages; dated Dec. 20, 2023.

* cited by examiner

*Primary Examiner* — Md S Elahee
(74) *Attorney, Agent, or Firm* — Gray Ice Higdon

(57) ABSTRACT

Implementations related to facilitating continued conversations of a user with an automated assistant when the user changes locations relative to one or more devices in an ecosystem of linked assistant devices. The user initially invokes a first device and provides a request, which is processed by the first device. The first device provides a notification to one or more other devices in the ecosystem to indicate that the user is likely to issue a further assistant request. The first device processes subsequent audio data to determine whether the subsequent audio data includes a further assistant request. The one or more other notified devices process device-specific sensor data to determine whether the user is co-present with the one of the other devices. If the user presence is detected, an indication is provided to the first device, causing the first device to cease processing subsequent audio data. Further, the co-present device starts to process subsequent audio data.

19 Claims, 9 Drawing Sheets

PROCESSING CONTINUED CONVERSATIONS OVER MULTIPLE DEVICES

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an explicit input (e.g., commands, queries, and/or requests) to the automated assistant that can cause the automated assistant to generate and provide responsive output, to control one or more Internet of things (IoT) devices, and/or to perform one or more other functionalities (e.g., assistant actions). This explicit input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by assistant devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), audio data of a spoken utterance of a user (or a text conversion thereof), and optionally data indicative of the user's identity (e.g., credentials). The cloud-based counterpart may perform various processing on the explicit input to return result(s) to the automated assistant client, which may then provide corresponding output to the user. In other cases, automated assistants may be exclusively executed locally by assistant devices and that are engaged directly by users to reduce latency.

Many users may engage automated assistants in performing routine day-to-day tasks via assistant actions. For example, a user may routinely provide one or more explicit user inputs that cause an automated assistant to check the weather, check for traffic along a route to work, start a vehicle, and/or other explicit user input that causes the automated assistant to perform other assistant actions while the user is eating breakfast. As another example, a user may routinely provide one or more explicit user inputs that cause an automated assistant to play a particular playlist, track a workout, and/or other explicit user input that cause an automated assistant to perform other assistant actions in preparation for the user to go on a run. However, in some instances, multiple devices may be in the vicinity of the user and may be configured to process requests of the user. Thus, determining which device to best process audio data can improve the user experience when interacting with multiple devices that are configured in an ecosystem of connected devices.

SUMMARY

Some implementations disclosed herein relate to selecting a second device to process audio data to continue a conversation with a user that was initiated with an automated assistant executing on a first device. The user can invoke an automated assistant on a first device and the first device can process a request that is provided with the invocation (e.g., before the invocation and/or proceeding the invocation). In addition to processing the request to determine one or more actions to be performed, the automated assistant can determine that a follow-up request is likely. In response, the automated assistant can provide a notification to one or more other devices that are linked to the first device via an ecosystem of linked devices, that a follow-up request is likely. Each of the notified devices (and/or automated assistants executing at least in part on each of the notified devices) can process sensor data from sensors of the corresponding device and determine whether the user is present in the vicinity of one of the other devices. If the user is detected to be present near one of the other devices, that device can send an indication to the first device that the user has changed position and that subsequent audio data can be processed by that device. In response, the first device can cease to process subsequent audio data and the device that is nearest to the user can commence processing audio data in anticipation of a follow-up request.

As an example, a user can invoke a first smart device (e.g., "OK Smart Speaker" to invoke a smart speaker) and issue a query of "What is the weather like here today?"). The automated assistant executing on the smart speaker can determine and provide a response ("It is going to be 75 and sunny today") and further determine that the user may follow up the query with another related query (e.g., "What about in Miami"). In response, the automated assistant executing on the smart speaker (or another application that is executing on the smart speaker) can provide a notification to one or more other linked devices that are part of an ecosystem of linked devices that includes the smart speaker (e.g., a second smart speaker in another room, a smart television, a smartphone in another location). The notification can indicate that the user may be issuing a follow-up query that may be captured by a microphone of one of the other devices. Each of the other devices can then process sensor data from sensors of the corresponding device (i.e., each automated assistant processes the sensor data from the sensors of the device that is executing the automated assistant) to determine whether the user has moved and is now present near the device. For example, a smartphone can utilize accelerometer data to determine whether the user has picked up and/or moved the smartphone, a device with a camera can determine whether the user has entered a field of view of the camera, etc.). Once user presence near one of the other devices is determined, that device can provide an indication to the first device (i.e., the device that processed the first request) to indicate that it will handle subsequent follow-up requests. In response, the first device can cease to process subsequent audio data and the device nearest to the user can commence processing audio data to capture any follow-up request that is provided by the user.

In some implementations, processing of audio data can be delayed such that an automated assistant does not start processing subsequent audio data immediately after performing an action but instead can delay until a later time. For example, a user can request that a song be played via one or more speakers of devices and audio data can be processed when the song ends and/or towards the end of the song. In a similar manner as previously described, the presence of the user can be determined based on sensor data from sensors of the devices of the ecosystem to determine whether the user has moved while the song plays. If the user is detected to be near a device other than the device that first received the invocation, the automated assistant of the first device can cease processing audio data and a device that is nearer to the user when the song is ending can start to process audio data.

In some implementations, the same automated assistant can be executing on multiple devices. For example, an automated assistant can be executing, in part, on a first device, a second device, and on a cloud-based device such that the cloud-based device performs some or all of the processing of the audio data. In those instances, all of the devices may have access to the context of the conversation that was initiated with the first device and thus can be utilized in processing of subsequent requests. However, in some instances, the device that is processing subsequent audio data may require the context of the previous conversation in order to process a follow-up request. For example, a first automated assistant, executing on a first device, can process the initial request, determine that a follow-up request is likely to occur, and send notifications to other linked devices to process sensor data to determine if the user has changed locations. If one of the devices provides a notification indicating presence of the user near that device, the first device can provide context for the prior request(s) such that the second device can resolve any contextual ambiguities in the follow-up request(s). For example, a user may invoke an automated assistant on a first device with "OK, Speaker" and continue with the query "what's the weather today." This query can be followed up with "How about tomorrow," which requires context from the previous query in order to resolve the intent of the request. Thus, the first device that is executing the first automated assistant can provide the second automated assistant, executing on a second device, with the context of the previous conversation such that the second automated assistant can resolve the intent of "how about tomorrow."

In some implementations, the first automated assistant can determine a user profile that is associated with the user that invoked the first automated assistant. For example, the first automated assistant can utilize text dependent (TD) and/or text independent (TI) speaker verification to identify a user profile that is associated with the speaker. In some implementations, the first automated assistant can provide, along with the notification, an indication of the speaker of the first request (e.g., an indication of a user profile that is associated with the speaker, a vector embedding of the speaker) such that the one or more other devices can determine whether the same speaker is co-present with one or more of the other devices.

For example, one of the other devices can determine that a person is co-present with the device utilizing sensor data from one or more sensors of the device (e.g., accelerometer data) and can process some audio data and/or visual data to determine whether the co-present person is the user utilizing, for example, TI by comparing captured audio data to a vector representing the user speaking one or more phrases. Thus, in some implementations, the other devices can determine whether the same speaker as the user that uttered the initial request (and invocation) is co-present and only further process audio data to identify a follow-up request if it determines that the user is co-present with the device.

In some implementations, a user may utter an invocation phrase that invokes multiple automated assistants, either executing on the same device or executing on separate devices. For example, a user may utter an invocation phrase of "OK Assistant A and Assistant B, how tall is Barack Obama?," which can invoke both a first assistant (i.e., "OK Assistant A") and a second automated assistant (i.e., "OK Assistant B"). In some implementations, both automated assistants can process the audio data and determine that a follow-up query is likely. Further, each of the automated assistants can determine a likelihood of whether the follow-up query will likely be directed to it or to the other automated assistant. For example, the first automated assistant may be configured to handle queries in audio data whereas the second automated assistant may be configured to handle playback of media. If an invoked automated assistant determines that a follow-up query will not be likely to be directed to it (or more likely will be directed to another automated assistant, it can cease to process subsequent audio data and instead allow the more likely automated assistant to handle the follow-up query.

As another example, the user can invoke automated assistants executing on different devices by indicating, in the invocation, the devices that are executing the separate automated assistants. For example, the user may utter "OK Kitchen Devices, show me a weather map of Miami." In response, automated assistants that are executing on multiple devices that are "Kitchen Devices," (e.g., a smart speaker and a smart screen with a graphical interface) may be invoked and start to process the request. The smart speaker may determine that, if there is a follow-up query, the follow-up query may likely require a graphical interface. In response, the smart speaker can cease to process subsequent audio data and instead allow the smart screen that includes a graphical interface to handle subsequent follow-up queries (e.g., "Now show me Los Angeles").

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
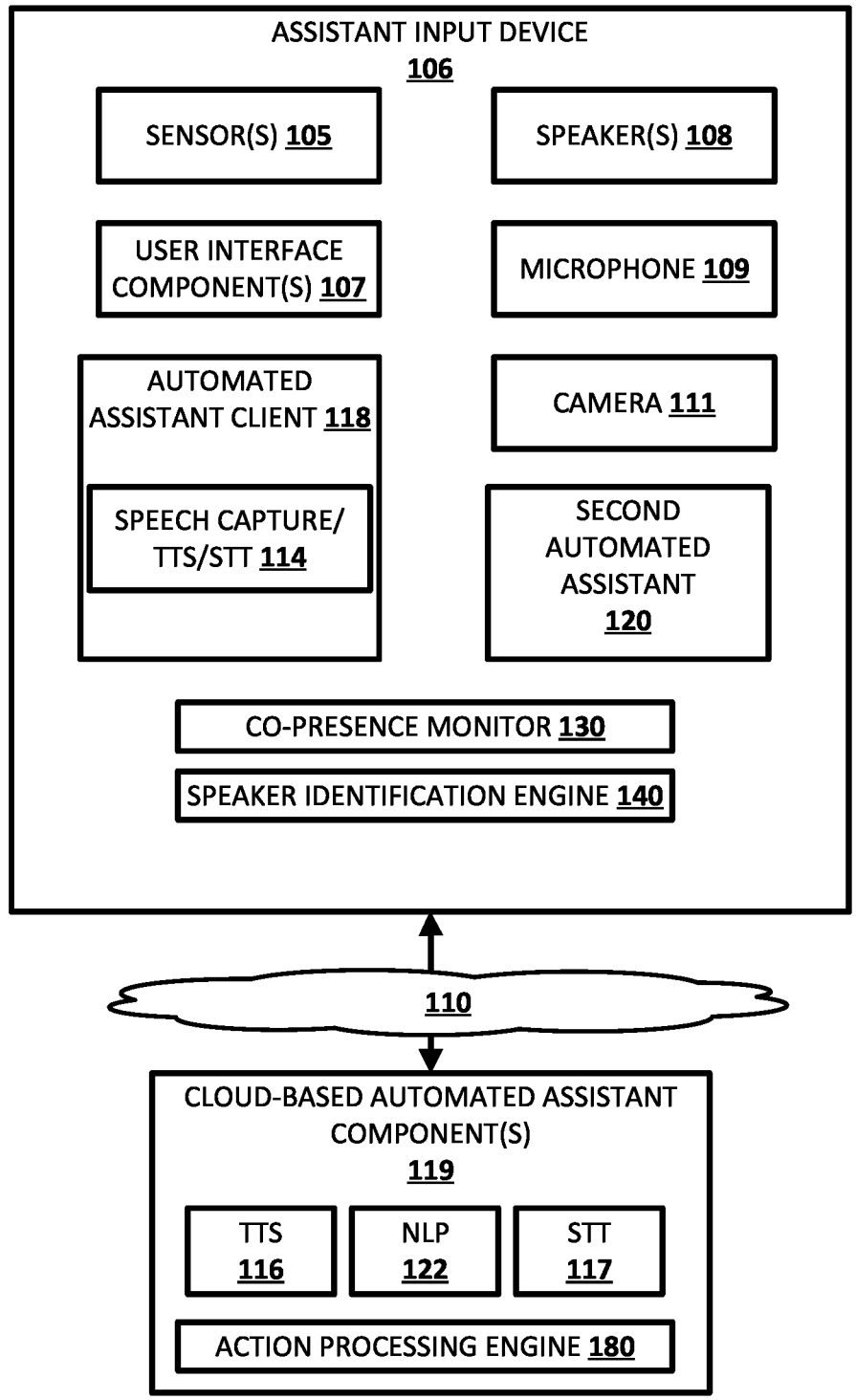
FIG. 1 is a block diagram of an example environment in which implementations disclosed herein may be implemented.

Turning now to FIG. 1, an example environment in which techniques disclosed herein may be implemented is illustrated. The example environment includes a plurality of assistant input devices 106 and one or more cloud-based automated assistant components 119. One or more (e.g., all) of the assistant input devices 106 can execute a respective instance of a respective automated assistant client 118.

However, in some implementations one or more of the assistant input devices 106 can optionally lack an instance of the respective automated assistant client 118, and still include engine(s) and hardware components for receiving and processing user input directed to an automated assistant (e.g., microphone(s) 109, speaker(s) 108, speech recognition engine(s), natural language processing engine(s), speech synthesis engine(s), and so on). An instance of the automated assistant client 118 can be an application that is separate from an operating system of the respective assistant input devices 106 (e.g., installed "on top" of the operating system)—or can alternatively be implemented directly by the operating system of the respective assistant input devices 106. As described further below, each instance of the automated assistant client 118 can optionally interact with one or more cloud-based automated assistant components 119 in responding to various requests provided by respective user interface components 107 of any one of the respective assistant input devices 106. Further, and as also described below, other engine(s) of the assistant input devices 106 can optionally interact with one or more of the cloud-based automated assistant components 119.

One or more the cloud-based automated assistant components 119 can be implemented on one or more computing systems (e.g., server(s) collectively referred to as a "cloud" or a "remote" computing system) that are communicatively coupled to respective assistant input devices 106 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 119 with the assistant input devices 106 is indicated generally by 110 of FIG. 1. Also, in some implementations, the assistant input devices 106 may be communicatively coupled with each other via one or more networks (e.g., LANs and/or WANs).

An instance of an automated assistant client 118, by way of its interactions with one or more of the cloud-based automated assistant components 119, may form what appears to be, from a user's perspective, a logical instance of an automated assistant with which the user may engage in a human-to-computer dialog. For example, a first automated assistant can be encompassed by a first automated assistant client 118 of a first assistant input device 106 and one or more cloud-based automated assistant components 119. A second automated assistant can be encompassed by a second automated assistant client 118 of a second assistant input device 106 and one or more cloud-based automated assistant components 119. The first automated assistant and the second automated assistant may also be referred to herein simply as "the automated assistant". It thus should be understood that each user that engages with an automated assistant client 118 executing on one or more of the assistant input devices 106 may, in effect, engage with his or her own logical instance of an automated assistant (or a logical instance of automated assistant that is shared amongst a household or other group of users and/or shared amongst multiple automated assistant clients 118). Although only a plurality of assistant input devices 106 are illustrated in FIG. 1, it is understood that cloud-based automated assistant component(s) 119 can additionally serve many additional groups of assistant input devices. Moreover, although various engines of the cloud-based automated assistant components 119 are described herein as being implemented separate from the automated assistant clients 118 (e.g., at server(s)), it should be understood that it is for the sake of example and is not meant to be limiting. For instance, one or more (e.g., all) of the engines described with respect to the cloud-based automated assistant components 119 can be implemented locally by one or more of the assistant input devices 106.

The assistant input devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant. Additional and/or alternative assistant input devices may be provided. In some implementations, the plurality of assistant input devices 106 can be associated with each other in various ways in order to facilitate performance of techniques described herein. For example, in some implementations, the plurality of assistant input devices 106 may be associated with each other by virtue of being communicatively coupled via one or more networks (e.g., via the network(s) 110 of FIG. 1). This may be the case, for instance, where the plurality of assistant input devices 106 are deployed across a particular area or environment, such as a home, a building, and so forth. Additionally, or alternatively, in some implementations, the plurality of assistant input devices 106 may be associated with each other by virtue of them being members of a coordinated ecosystem that are at least selectively accessible by one or more users (e.g., an individual, a family, employees of an organization, other predefined groups, etc.). In some of those implementations, the ecosystem of the plurality of assistant input devices 106 can be manually and/or automatically associated with each other in a device topology representation of the ecosystem.

In various implementations, one or more of the assistant input devices 106 may include one or more respective sensors 105 that are configured to provide, with approval from corresponding user(s), sensor data indicative of one or more environmental conditions present in the environment of the device. In some of those implementations, the automated assistant can identify one or more of the assistant input devices 106 to satisfy a spoken utterance from a user that is associated with the ecosystem. The spoken utterance can be satisfied by rendering responsive content (e.g., audibly and/or visually) at one or more of the assistant input devices 106, by causing one or more of the assistant input devices 106 to be controlled based on the spoken utterance, and/or by causing one or more of the assistant input devices 106 to perform any other action to satisfy the spoken utterance.

The respective sensors 105 may come in various forms. Some assistant input devices 106 may be equipped with one or more digital cameras that are configured to capture and provide signal(s) indicative of movement detected in their fields of view. Additionally, or alternatively, some assistant input devices 106 may be equipped with other types of light-based sensors 105, such as passive infrared ("PIR") sensors that measure infrared ("IR") light radiating from objects within their fields of view. Additionally, or alternatively, some assistant input devices 106 may be equipped with sensors 105 that detect acoustic (or pressure) waves, such as one or more microphones.

Additionally, or alternatively, in some implementations, the sensors 105 may be configured to detect other phenomena associated with the environment that includes at least a part of the ecosystem. For example, in some embodiments, a given one of the assistant devices 106 may be equipped with a sensor 105 that detects various types of wireless signals (e.g., waves such as radio, ultrasonic, electromagnetic, etc.) emitted by, for instance, other assistant devices carried/operated by a particular user (e.g., a mobile device, a wearable computing device, etc.) and/or other assistant devices in the ecosystem. For example, some of the assistant devices 106 may be configured to emit waves that are imperceptible to humans, such as ultrasonic waves or infrared waves, that may be detected by one or more of the assistant input devices 106 (e.g., via ultrasonic/infrared receivers such as ultrasonic-capable microphones). Also, for example, in some embodiments, a given one of the assistant devices 106 may be equipped with a sensor 105 to detect movement of the device (e.g., accelerometer), temperature in the vicinity of the device, and/or other environmental conditions that can be detected near the device (e.g., a heart monitor that can detect the current heart rate of the user).

Additionally, or alternatively, various assistant devices may emit other types of human-imperceptible waves, such as radio waves (e.g., Wi-Fi, Bluetooth, cellular, etc.) that may be detected by other assistant devices carried/operated by a particular user (e.g., a mobile device, a wearable computing device, etc.) and used to determine an operating user's particular location. In some implementations, GPS and/or Wi-Fi triangulation may be used to detect a person's location, e.g., based on GPS and/or Wi-Fi signals to/from the assistant device. In other implementations, other wireless signal characteristics, such as time-of-flight, signal strength, etc., may be used by various assistant devices, alone or collectively, to determine a particular person's location based on signals emitted by the other assistant devices carried/operated by the particular user.

Additionally, or alternatively, in some implementations, one or more of the assistant input devices 106 may perform speaker recognition to recognize a user from their voice. For example, some instances of the automated assistant may be configured to match a voice to a user's profile, e.g., for purposes of providing/restricting access to various resources. Various techniques for user identification and/or authorization for automated assistants have been utilized. For example, in identifying a user, some automated assistants utilize text-dependent techniques (TD) that is constrained to invocation phrase(s) for the assistant (e.g., "OK Assistant" and/or "Hey Assistant"). With such techniques, an enrollment procedure is performed in which the user is explicitly prompted to provide one or more instances of a spoken utterance of the invocation phrase(s) to which the TD features are constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD machine learning model to generate a corresponding speaker embedding for each of the utterances. The speaker features can then be generated as a function of the speaker embeddings, and stored (e.g., on device) for use in TD techniques. For example, the speaker features can be a cumulative speaker embedding that is a function of (e.g., an average of) the speaker embeddings. Text-independent (TI) techniques have also been proposed for utilization in addition to or instead of TD techniques. TI features are not constrained to a subset of phrase(s) as is in TD. Like TD, TI can also utilize speaker features for a user and can generate those based on user utterances obtained through an enrollment procedure and/or other spoken interactions, although many more instances of user utterances may be required for generating useful TI speaker features.

After the speaker features are generated, the speaker features can be used in identifying the user that spoke a spoken utterance. For example, when another spoken utterance is spoken by the user, audio data that captures the spoken utterance can be processed to generate utterance features, those utterance features compared to the speaker features, and, based on the comparison, a profile can be identified that is associated with the speaker features. As one particular example, the audio data can be processed, using the speaker recognition model, to generate an utterance embedding, and that utterance embedding compared with the previously generated speaker embedding for the user in identifying a profile of the user. For instance, if a distance metric between the generated utterance embedding and the speaker embedding for the user satisfies a threshold, the user can be identified as the user that spoke the spoken utterance.

Each of the assistant input devices 106 further includes respective user interface component(s) 107, which can each include one or more user interface input devices (e.g., microphone, touchscreen, keyboard, and/or other input devices) and/or one or more user interface output devices (e.g., display, speaker, projector, and/or other output devices). As one example, user interface components 107 of assistant input device 106 can include only speaker(s) 108 and microphone(s) 109, whereas user interface components 107 of another assistant input device 106 can include speaker(s) 108, a touchscreen, and microphone(s) 109.

Each of the assistant input devices 106 and/or any other computing device(s) operating one or more of the cloud-based automated assistant components 119 may include one or more memories for storage of data and software applications, one or more processors for accessing data and executing applications, and other components that facilitate communication over a network. The operations performed by one or more of the assistant input devices 106 and/or by the automated assistant may be distributed across multiple computer systems. The automated assistant may be implemented as, for example, computer programs running on one or more computers in one or more locations that are coupled to each other through a network (e.g., the network(s) 110 of FIG. 1).

As noted above, in various implementations, each of the assistant input devices 106 may operate a respective automated assistant client 118. In various embodiments, each automated assistant client 118 may include a respective speech capture/text-to-speech (TTS)/speech-to-text (STT) module 114 (also referred to herein simply as "speech capture/TTS/STT module 114"). In other implementations, one or more aspects of the respective speech capture/TTS/STT module 114 may be implemented separately from the respective automated assistant client 118 (e.g., by one or more of the cloud-based automated assistant components 119).

Each respective speech capture/TTS/STT module 114 may be configured to perform one or more functions including, for example: capture a user's speech (speech capture, e.g., via respective microphone(s) 109); convert that captured audio to text and/or to other representations or embeddings (STT) using speech recognition model(s) stored in a database; and/or convert text to speech (US) using speech synthesis model(s) stored in a database. Instance(s) of these model(s) may be stored locally at each of the respective assistant input devices 106 and/or accessible by the assistant input devices (e.g., over the network(s) 110 of FIG. 1). In some implementations, because one or more of the assistant input devices 106 may be relatively constrained in terms of computing resources (e.g., processor cycles, memory, battery, etc.), the respective speech capture/TTS/STT module 114 that is local to each of the assistant input devices 106 may be configured to convert a finite number of different spoken phrases to text (or to other forms, such as lower dimensionality embeddings) using the speech recognition model(s). Other speech input may be sent to one or more of the cloud-based automated assistant components 119, which may include a cloud-based US module 116 and/or a cloud-based SU module 117.

Cloud-based STT module 117 may be configured to leverage the virtually limitless resources of the cloud to convert audio data captured by speech capture/TTS/STT module 114 into text (which may then be provided to natural language processing (NLP) module 122) using speech recognition model(s). Cloud-based TTS module 116 may be configured to leverage the virtually limitless resources of the cloud to convert textual data (e.g., text formulated by automated assistant) into computer-generated speech output using speech synthesis model(s). In some implementations, the cloud-based US module 116 may provide the computer-generated speech output to one or more of the assistant devices 106 to be output directly, e.g., using respective speaker(s) 108 of the respective assistant devices. In other implementations, textual data (e.g., a client device notification included in a command) generated by the automated assistant using the cloud-based TTS module 116 may be provided to speech capture/TTS/STT module 114 of the respective assistant devices, which may then locally convert the textual data into computer-generated speech using the speech synthesis model(s), and cause the computer-generated speech to be rendered via local speaker(s) 108 of the respective assistant devices.

The NLP module 122 processes natural language input generated by users via the assistant input devices 106 and may generate annotated output for use by one or more other components of the automated assistant, the assistant input devices 106. For example, the NLP module 122 may process natural language free-form input that is generated by a user via one or more respective user interface input devices of the assistant input devices 106. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an assistant input device notification rendered immediately prior to receiving the natural language input on which the assistant input device notification is based.

In some implementations, one or more of the assistant input devices 106 can include a second automated assistant 120 that includes one or more of the components that share characteristics with components that are described herein with respect to automated assistant client 118 and/or cloud-based components 119. For example, in addition to or in lieu of including automated assistant client 118, one or more assistant input devices 106 can include a second automated assistant 120 that can include a speech capture component, TTS, STT, NLP, and/or one or more fulfillment engines for processing requests that are received from the user. In some implementations, second automated assistant 120 can include one or more cloud-based components that are unique from the cloud-based components 119. For example, second automated assistant 120 can be a standalone automated assistant with capabilities to process audio data, recognize one or more wakewords and/or invocation phrases, process additional audio data to identify a request that is included in the audio data, and cause one or more actions to be performed in response to the request.

Figure 2:
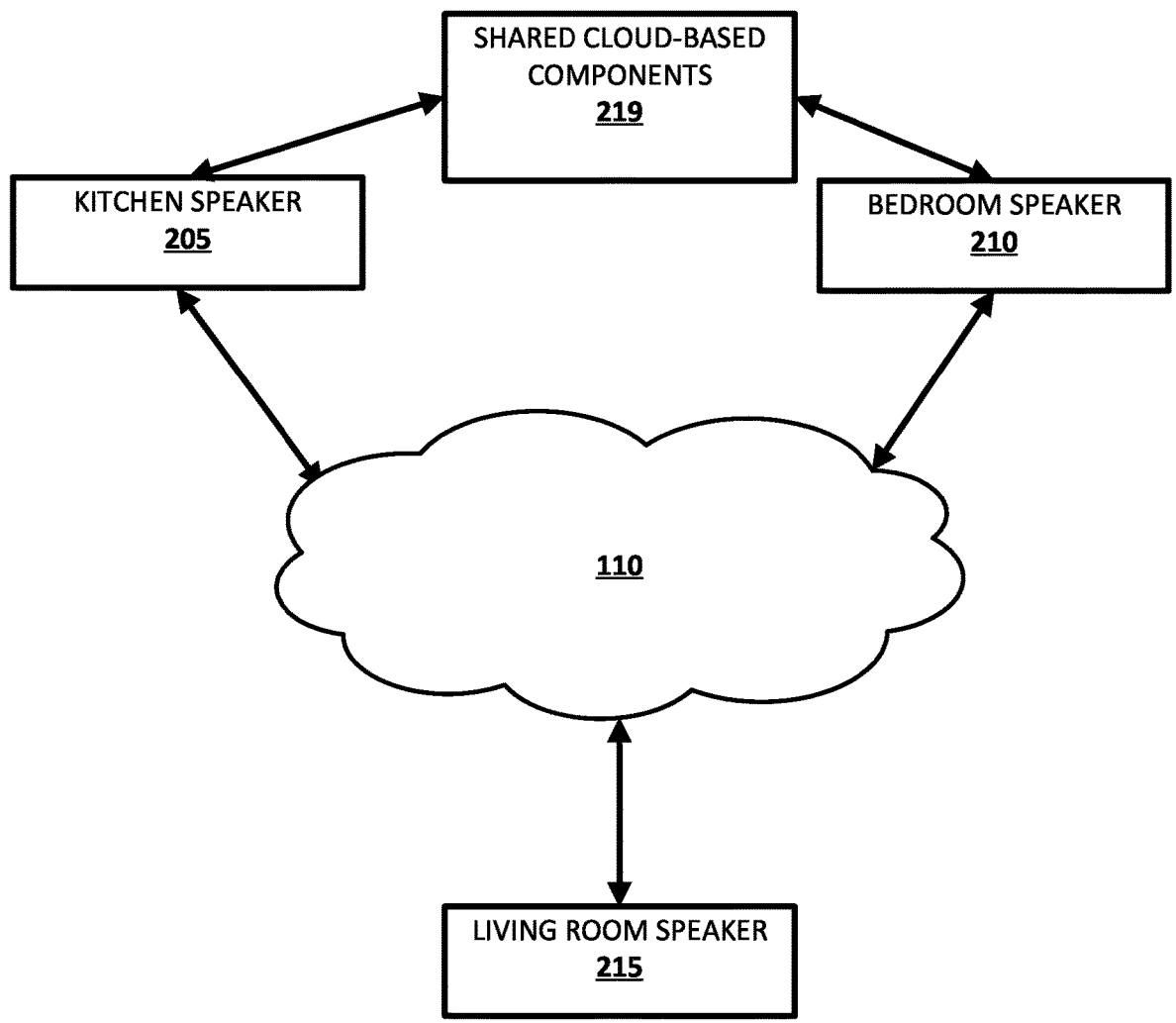
FIG. 2 is an illustration of an example ecosystem of connected devices.

Referring to FIG. 2, an illustration of an ecosystem of connected devices is provided for example purposes. In some implementations, an ecosystem can include additional components, fewer components, and/or different components than what are illustrated in FIG. 2. However, for example, purposes with regards to examples further described in relation to FIGS. 3-6, an ecosystem will be utilized as an example that includes a kitchen speaker 205, a bedroom speaker 210, and a living room speaker 215, each including one or more components of an assistant input device 106. For example, kitchen speaker 205 can be executing an automated assistant client 118 that further includes one or more of the components of the automated assistant client 118 illustrated in FIG. 1 (and further, one or more sensors 105 and/or user interface components 107). The ecosystem of FIG. 2 can include devices that are connected to one another and that are further in the environment of the user but in different locations. For example, a user may have a kitchen speaker 205 sitting on a counter in the kitchen, bedroom speaker 210 in a bedroom, and a living room speaker in a living room. Thus, for explanation purposes only, speakers of devices 205, 210, and 215 can be heard by the user (thus can respond to requests) and/or microphones of the devices 205, 210, and 215 can capture audio data of a user uttering an invocation phrase and/or request while the user is near (i.e., co-present) with the device.

Further, for exemplary purposes only, examples described herein will assume that kitchen speaker 205 and bedroom speaker share one or more cloud-based assistant components 219 that perform one or more actions. However, it is to be understood that one or more of the assistant input devices 106 can include one or more of the components illustrated in FIG. 1 as being components of the cloud-based assistant and can be performed by a device of the ecosystem that includes one or more of the components. For example, a living room speaker 215 can include one or more of the components of the cloud-based assistant components 219 and can, in some configurations, receive and process requests in the same manner as described herein with regards to kitchen speaker 205 and bedroom speaker 210, which share cloud-based automated assistant components 219 (i.e., living room speaker 215 may be a device that does not include an automated assistant client 118 but instead only includes a second automated assistant 120. Further, one or more other components, such as information related to the context of conversations between the automated assistant and the user, may be accessible to one or more of the assistant input devices 106. Thus, for a conversation that is started with the automated assistant client of kitchen speaker 205, the context may be available to bedroom speaker 210 but not to living room speaker 215.

In some implementations, the automated assistant executing on one of the devices of the ecosystem of devices can be invoked by the user performing an action (e.g., touching the device, performing a gesture that is captured by a camera of the device) and/or uttering an invocation phrase that indicates that the user has interest in the automated assistant performing one or more actions. For example, the user can utter "OK Kitchen Assistant," and the automated assistant of kitchen speaker 205 can process audio that precedes and/or follows the invocation to determine whether a request is included in the audio data. Audio data that is captured by the microphones of kitchen speaker 205 can be processed, utilizing STT, NLP, and/or ASR, by the automated assistant client executing on the device and/or, at least in part, by one or more components of cloud-based components 219.

Upon determining that the audio data includes a request, action processing engine 180 (shown in FIG. 1 as a component of cloud-based automated assistant components 119, but can additionally or alternatively be a component of automated assistant client 118) can determine one or more actions to perform and cause performance of the action(s). For example, the user may utter "OK Kitchen Assistant," followed by "how tall is Barack Obama." In response, action processing engine 180 can generate a response to the request (or "query") and provide, via the microphone(s) 109 of kitchen speaker 205, a response to the query.

In some implementations, the user may activate, prior to starting a conversation with one or more of the automated assistants, a continued conversation mode that allows the user to continue with subsequent requests without explicitly re-invoking the automated assistant. For example, in some implementations, after an action is initiated and/or after an action is performed, the invoked automated assistant can continue to process audio data to determine whether a follow-up request and/or query is included in the audio data. For example, a user may invoke an automated assistant with an invocation phrase of "OK Assistant, what is the weather in Miami" and the automated assistant can generate and provide a response. Subsequently, the automated assistant can continue to process audio data to determine whether the user provides a follow-up request. This can include, for example, processing the audio data locally by the automated assistant client without providing for complete processing until it is determined that the audio data includes a follow-up request, processing only a limited amount of audio data (e.g., 5 seconds after a response has been provided to the first query), and/or other limited processing that can determine whether the user has followed up the first request with an additional request. In some implementations, automated assistant client 118 and/or one or more components of cloud-based automated assistant 119 can determine whether a query is likely to be followed by a follow-up query. For example, for the initial query of "What is the weather in Miami," automated assistant 118 can determine that the user is likely to issue an additional query (e.g., a related query), such as "How about in Orlando," and process the audio data to determine whether an additional query is submitted by the user.

In some implementations, the automated assistant can process audio data as an action is being performed and/or subsequent to an action being performed in response to a request by the user. For example, the user can provide a request of "Play the song we will rock you," and in response, the automated assistant can cause the song "We Will Rock You" to be played via the speakers of the device that is executing the automated assistant. Once the song has completed and/or as the song is completing, the automated assistant can begin to process audio data in anticipation of the user requesting a new song to be played after the current song has completed. Thus, in some implementations, computing resources can be conserved by only processing audio data when it is likely that the user will issue a new request rather than processing continuously and wasting resources when the user is less likely to issue a new request.

Once an invoked automated assistant 118 determines that a follow-up request is likely (e.g., a "continued conversation" mode is active and a request is of a type that may be followed by another request without an intervening invocation phrase), the automated assistant 118 can send a notification to one or more other devices, each executing an automated assistant and/or automated assistant client, that the user may provide a follow-up request. Referring again to FIG. 1, assistant input devices 106 include a co-presence monitor 130 that can determine, based on sensor data generated by sensors 105, camera 111, and/or microphone 109, whether a user is co-present with the device. As illustrated, co-presence monitor 130 is illustrated as a component of assistant input device 106. However, in some implementations, co-presence monitor 130 can be a component of automated assistant client 118, the second automated assistant 120, the cloud-based automated assistant component(s) 119, and/or shared between one or more of the automated assistant components.

In some implementations, a notification can be provided to the one or more other devices of the ecosystem of devices when the user is detected to be moving away from the invoked device and/or that the user is currently changing positions. For example, the invoked automated assistant 118 can process sensor data from one or more sensors of the assistant device 106 to determine whether the user is present near the device 106. If automated assistant 118 determines, based on the sensor data, that the user is changing position to a position that is farther away from the device 106, the automated assistant 118 can provide the notification to the other devices of the ecosystem of devices so that those devices can begin processing sensor data to determine whether the user is changing position to a location that is nearer to one of those other devices.

In some implementations, the invoked automated assistant 118 can provide, with the notification, an indication of the user that invoked the automated assistant (and subsequently provided a request). For example, a user can invoke kitchen speaker 205 with "OK Kitchen Speaker," and one or more components of the automated assistant executing on the kitchen speaker 205 and/or one or more shared components 219 can utilize one or more TD speaker identification models to determine a vector based on the speech. The vector can be utilized to identify a user profile that is associated with speaker by comparing the vector to one or more stored vectors for the user that were, for example, generated during a registration period by the user (e.g., the user may be prompted to say "OK Kitchen Speaker" one or more times and a profile of the user speaking the phrase can be stored with a user profile). Also, for example, kitchen speaker 205 can utilize one or more TI models to process the request provided by the user and a TI vector can be generated that can be provided with the notification to the one or more other devices of the ecosystem. Thus, in some implementations, a user profile indicator and/or a vector representing at least some portion of an utterance of the user can be provided to, for example, bedroom speaker 210 and/or living room speaker 215 such that the other devices can determine, based on processing of audio data captured by that device, whether a co-present user is the same user as the one that uttered the initial request (and/or invocation phrase).

Assistant input device 106 further includes a speaker identification engine 140 that can determine, based on processing audio and/or camera data, whether a user that is associated with a user profile is the same as the user that uttered an invocation phrase and/or request.

Figure 3:
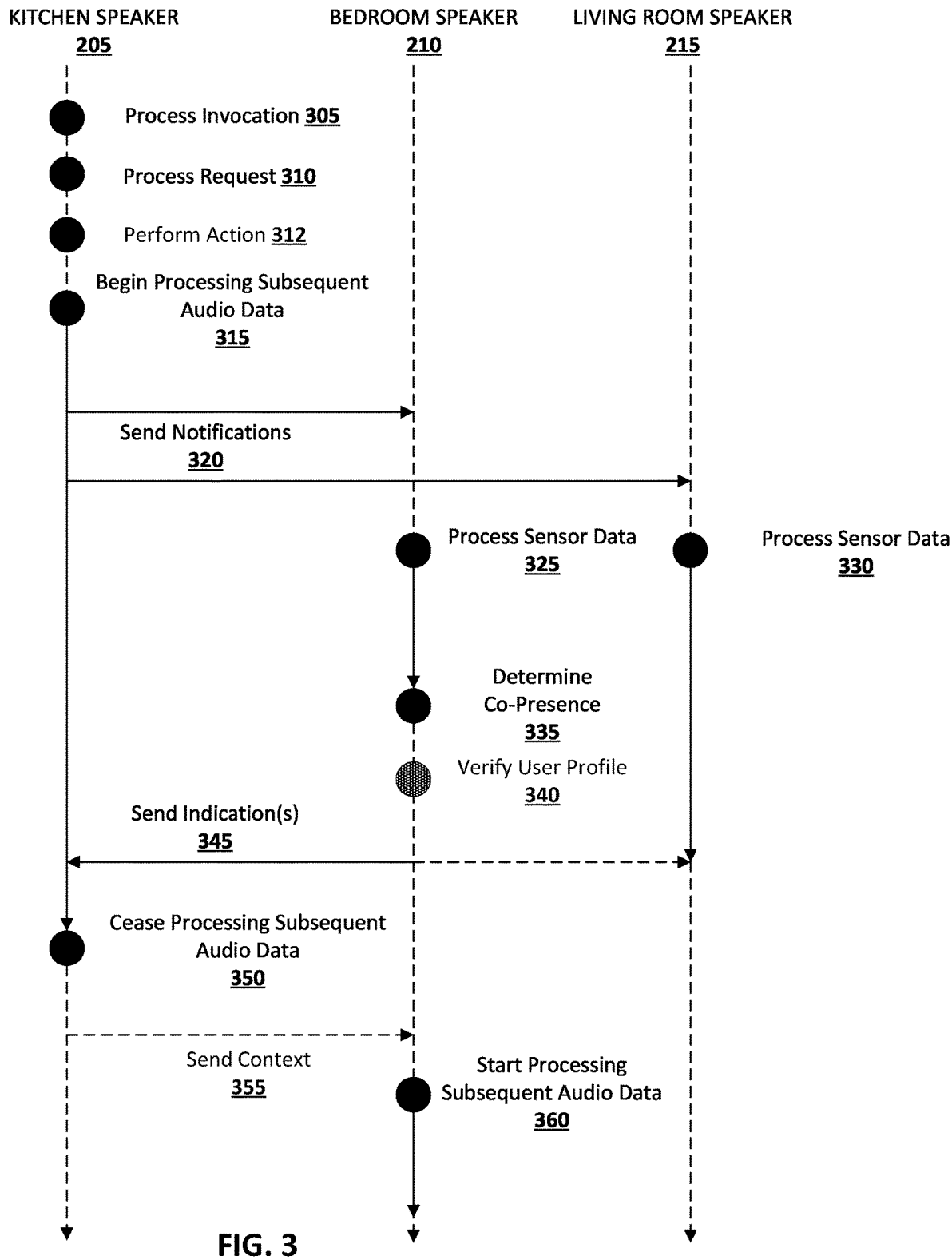
FIG. 3 is a timing diagram illustrating an example method for selectively processing audio data in a continued conversation mode.

Referring to FIG. 3, a timing diagram is illustrated that illustrates one or more implementations described herein. As illustrated, kitchen speaker 205 processes the invocation 305 and further processes a request 310. In response, one or more actions 312 is performed by the kitchen speaker 205. In addition to processing the request 310, kitchen speaker 205 (i.e., the automated assistant executing on kitchen speaker 205) can further determine that a follow-up request is likely, which can be determined by the content of the request in addition to a "continued conversation" mode being active. Once the action is performed 312 (or while the action is being performed) subsequent audio data can be processed 315 by the kitchen speaker 205 to identify a follow-up request that may be included in the subsequent audio data.

Notifications are provided 320, by the kitchen speaker 205, to the other devices of the ecosystem of linked devices. In some implementations, the notifications 320 can include an indication that a user may be co-present with the device (s) and to determine if/when this occurs. In some implementations, the invocation phrase and/or the request can be processed to determine a user and/or a user profile, and an indication of the user or a user speaker profile (e.g., a vector representing the speaking voice of the user) can be provided with the notification 320.

In response to receiving the notifications 320, the bedroom speaker 210 and the living room speaker 215 can process sensor data 325 utilizing a component that shares one or more characteristics with co-presence monitor 130 to determine whether a user is co-present with each device. Co-presence monitor 130 can utilize, for example, sensor data from one or more sensors 105, microphones 109, and/or camera 11 to determine whether a user is present in proximity to the respective device 210 and 215. If a user is detected in proximity of a device 335, such as bedroom speaker 210, additional processing can be performed to determine whether the co-present user is the same user that uttered the invocation phrase and/or provided the request. Thus, as an additional optional step, the user profile that was provided with the notification at 320 can be verified at 340. As illustrated, bedroom speaker 210 processes its sensor data 325 and living room speaker 215 processes its sensor data 330. Further, as illustrated, bedroom speaker 210 determines a user is co-present 335 and, optionally, verifies that the co-present user is the same as the user indicated, by kitchen speaker 205, as uttering the invocation and/or initial request.

In response to determining that the user is co-present, bedroom speaker 210 can provide one or more indications 345 to the kitchen speaker 205 (and optionally, to the other device(s) of the ecosystem) to indicate that the user is now co-present with the bedroom speaker 210. As illustrated, upon receiving the indication, living room speaker 215 ceases to process sensor data 330. However, in some implementations, living room speaker 215 can continue to process sensor data to determine if the user has moved and, subsequently, whether the user is co-present with living room speaker 215. For example, the user may be walking from the kitchen, to the bedroom, and then to the living room rapidly. Thus, in some implementations, co-presence of the user with the bedroom speaker 210 may only be temporary and the user may subsequently be co-present with the living room speaker 215 after temporary co-presence with the bedroom speaker 210 was determined by bedroom speaker 210.

When kitchen speaker 205 receives an indication that the user (or a user) is co-present with the bedroom speaker 210, the kitchen speaker 205 can cease to process subsequent audio data 350. Further, bedroom speaker 210 can start to process subsequent audio data 360. In some implementations, bedroom speaker 210 can start to process subsequent audio data 360 before it sends the indication 345 to ensure that, at all times, at least one device is processing the subsequent audio data. In some implementations, the method can continue, with the bedroom speaker 210 sending notifications to the other devices indicating that it is processing subsequent audio data and further that a follow-up request is likely. The other devices, including the kitchen device 205, can process sensor data to determine whether the user has moved again and may be co-present with one of the other devices.

In some implementations, the kitchen device 205 can provide context 355 of previous requests to the device that is co-present with the user before the co-present device (e.g., 210) starts to process subsequent audio data. In some instances, the co-present device may already have the context, such as when the invoked automated assistant and the co-present automated assistant are both components of the same automated assistant that shares one or more components (e.g., both clients of the same automated assistant, wherein the context is stored on a cloud-based component shared by both clients). However, in instances wherein the invoked automated assistant and the co-present automated assistant are different automated assistants, context of the previous request(s) may be required by the co-present automated assistant before the co-present automated assistant can process subsequent requests.

For example, referring to FIG. 2, the user may invoke the automated assistant executing on kitchen speaker 205 with "OK Kitchen Assistant" and further provide a request of "how old is Barack Obama?" The request can be processed and further a notification can be provided to bedroom speaker 210 and living room speaker 215, indicating that a follow-up request is likely. Subsequently, living room speaker 215, which does not share components with kitchen speaker 205, can determine that the user is co-present. The living room speaker 215 can send an indication to kitchen speaker 205, which can provide context of the previous request. The context may be required by living room speaker 215 to process the follow-up request, such as to determine a meaning of "he" in a follow-up request of "how old is he?" However, in the instance that bedroom speaker 210 instead provided an indication that the user is co-present, the context may not be necessary because both kitchen speaker 205 and bedroom speaker 210 share cloud-based components 219 and thus may already share context information of previous requests, among other resources.

In some implementations, a user may invoke multiple automated assistants with a single invocation phrase and both of the automated assistants can initially process a request. For example, a user may utter an invocation phrase of "OK Assistant 1 and Assistant 2, show me a weather map of Miami," and in response, both automated assistant client 118 and second automated assistant 120 can process the request. One or both of the automated assistants can determine that a follow-up request is likely based on, for example, content of the request and/or activation of a continued conversation mode. In some implementations, one of the invoked automated assistants may determine that a follow-up request will not be likely to be directed to it. For example, second automated assistant 120 may not be configured to process the type of request that is likely to follow-up the initial request. In response, second automated assistant 120 can cease processing subsequent audio data, thus conserving processing resources of the assistant input and further limiting potentially sensitive information from being provided unnecessarily to a component that does not require the information.

Similarly, in some implementations, a user may invoke multiple automated assistants that are executing on different devices, and each automated assistant can start processing subsequent audio data to determine whether the user has provided a follow-up request. For example, the user may invoke all of the automated assistants of FIG. 3 with an invocation of "OK Speakers," followed by a request of "Show me a weather map of Miami." As an example, living room speaker 215 may not include a graphical interface and therefore is incapable of displaying a weather map. In response, living room speaker 215 can cease to process subsequent audio data if the automated assistant executing on living room speaker 215 determines that a follow-up request is likely to require a graphical interface that it does not have and therefore will be unable to process any follow-up request to "Show me a weather map of Miami."

Figure 4A:
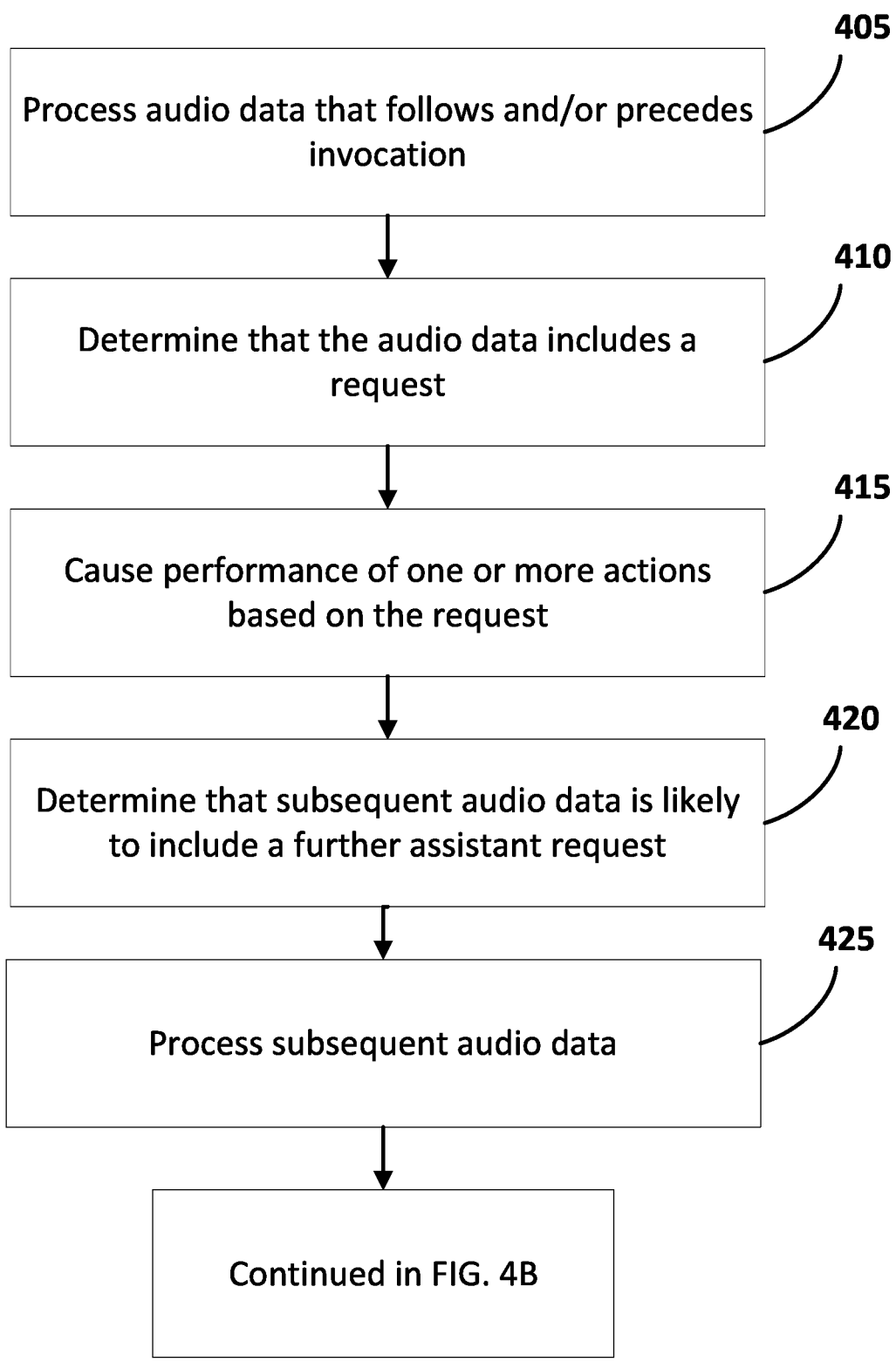
FIG. 4A and FIG. 4B is a flowchart illustrating an example method according to various implementations disclosed herein.
Figure 4B:
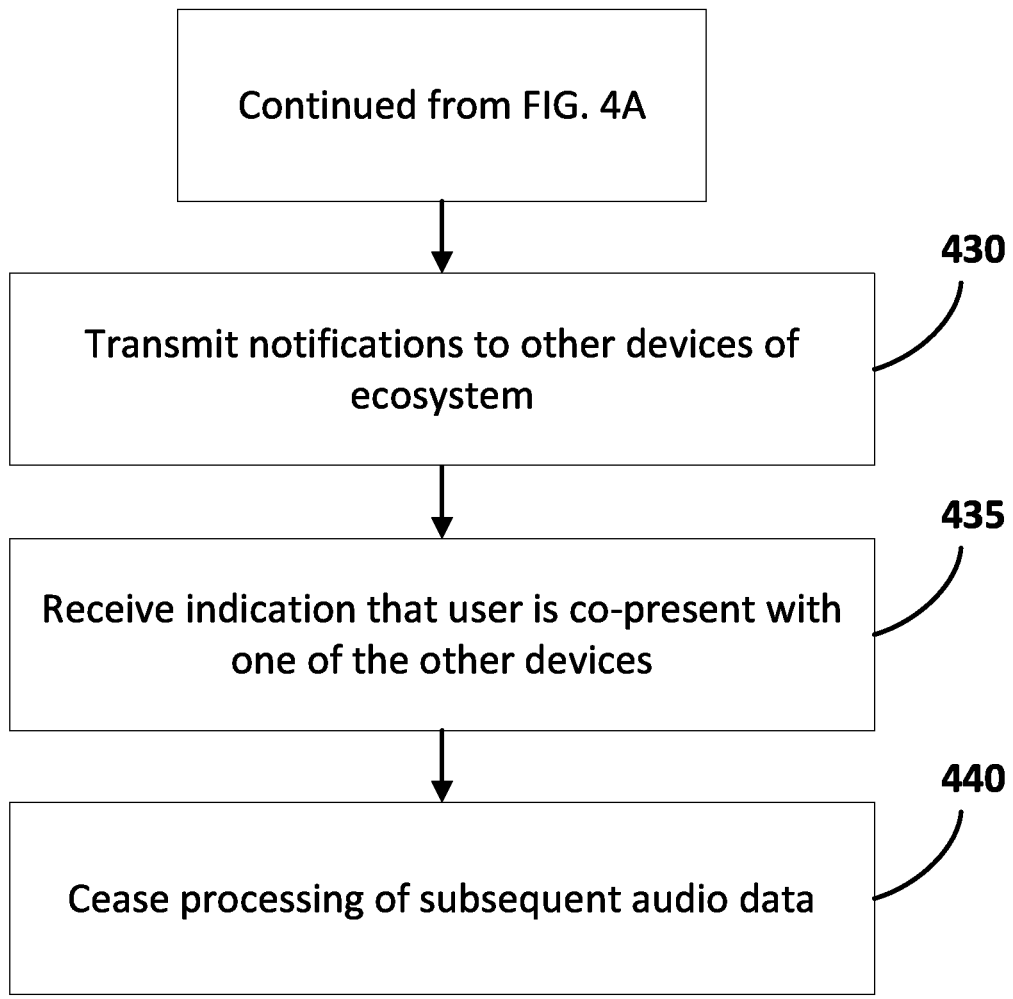

Referring to FIGS. 4A and 4B, a flowchart is provided that illustrates a method of determining whether to continue processing subsequent audio data when a user is co-present with another device of an ecosystem of linked devices. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 405, audio data that follows and/or precedes an invocation of an automated assistant is processed. The invocation phrase can invoke an automated assistant that shares one or more characteristics with automated assistant client 118 and/or second automated assistant 120. For example, in some implementations, the invoked automated assistant 118 can be a client that is executing, in part, on an assistant input device 106 and in part on another device, with cloud-based automated assistant components 119. In some implementations, the invoked automated assistant 120 can be a stand-alone automated assistant that is executing only on the assistant input device 106. In some implementations, the invoked automated assistant can be executing on a device that is part of an ecosystem of linked devices that are situated in an environment of a user. For example, the invoked automated assistant can share characteristics with one of the devices illustrated in FIG. 2.

At step 410, the invoked automated assistant determines that the audio data includes a request for the automated assistant to perform one or more actions. The invoked automated assistant 118 or 120 can determine, by processing a spoken utterance, that the audio data that precedes and/or follows an invocation of the automated assistant includes a request for the automated assistant to perform one or more actions. For example, one or more components of the automated assistant can process the audio data utilizing ASR, NLP, and/or STT to determine an intent of the user and provide instructions to an action processing engine 180 to perform one or more actions. For example, the user may utter "how tall is Barack Obama" and the query can be processed, provided to action processing engine 180, and action processing engine 180 can provide the query to one or more search engines to determine a response.

At step 415, the automated assistant causes performance of the one or more actions. For example, action processing engine 180 can provide instructions to one or more other components to perform an action (e.g., changing the status of a smart appliance), render a response to a query, and/or cause one or more other actions to be performed in response to the request of the user. In some implementations, a context of the request and/or the response can be stored locally by the automated assistant that fulfilled the request so that, for subsequent responses, the content of previous requests and/or responses can be utilized to determine an intent and/or meaning of one or more terms in subsequent requests. For example, for a request of "how tall is Barack Obama," context information can include "Barack Obama" such that, for a subsequent request of "how old is he," the term "he" can be understood to mean "Barack Obama."

At step 420, the invoked automated assistant determines that subsequent audio data is likely to include a further assistant request. In some implementations, a user may activate a "continued conversation" mode such that the automated assistant 118 can continue to process limited portions of subsequent audio data to determine if a request has been uttered without requiring the user to utter an invocation phrase again. Also, for example, in some implementations, automated assistant 118 can determine that a request that was initially processed is of a type that is likely to be followed up with a related request. For example, the user may provide a request of "What's the weather like today," and automated assistant 118 can determine that the user is likely (or may likely) follow up the request with a related request, such as "how about tomorrow."

At step 425, the automated assistant starts to process subsequent audio data to determine whether the subsequent audio data includes a further assistant request. For example, the user may utter a request of "play the song we will rock you," and in response, the automated assistant can cause playback of the requested song. Towards the end of the playback of the song (or after the song has started and/or concluded), the automated assistant can commence processing of audio data to determine whether the user has requested a new song. In some implementations, after a period of time of processing subsequent audio data without determining a request is included in the audio data, the automated assistant can cease to process audio data. For example, automated assistant client 118 can process 5 seconds of audio and, if a subsequent request is not included in the audio data, cease to process subsequent audio data until the automated assistant is invoked again.

At step 430, the automated assistant transmits a notification to other devices of an ecosystem of linked devices that includes the device executing the automated assistant. The notification can indicate that a further assistant request is likely and can cause the notified devices (e.g., cause an automated assistant executing on each of the devices) to process sensor data generated by sensors of the corresponding device to determine whether the user (or a user) is co-present with the device. For example, subsequent audio data may first be processed by a kitchen speaker automated assistant. A notification can be provided to devices in a bedroom and a living room indicating that the user may change positions but may still have interest in a continued conversation. Thus, by providing the notification, the other devices can utilize one or more techniques to determine whether a user is co-present (e.g., processing of audio data, camera data). In some implementations, an indication of the user that uttered the invocation may be provided with the notification. For example, the invoked automated assistant can process the invocation (and/or the request) using text-dependent and/or text-independent speaker identification to identify an associated user profile. The other devices can then perform limited processing of audio data (or visual data) to determine whether a user that is determined to be co-present with the device is the same user whose profile was provided with the notification. At step 435, the automated assistant receives an indication that the user (or a user) is co-present with one of the devices of the ecosystem of linked devices. In some implementations, the co-present device can start to process subsequent audio data.

At step 440, the automated assistant ceases to process subsequent audio data. Ceasing to process subsequent audio data can be in response to receiving the indication. In some implementations, the initially invoked automated assistant can further provide context to the automated assistant of the co-present device. For example, for an initial request of "how tall is Barack Obama," context can be provided to the co-present automated assistant (e.g., if the co-present automated assistant does not already have context) so that for a subsequent request of "how old is he," the intent of the term "he" can be resolved (e.g., referring to "Barack Obama").

Figure 5:
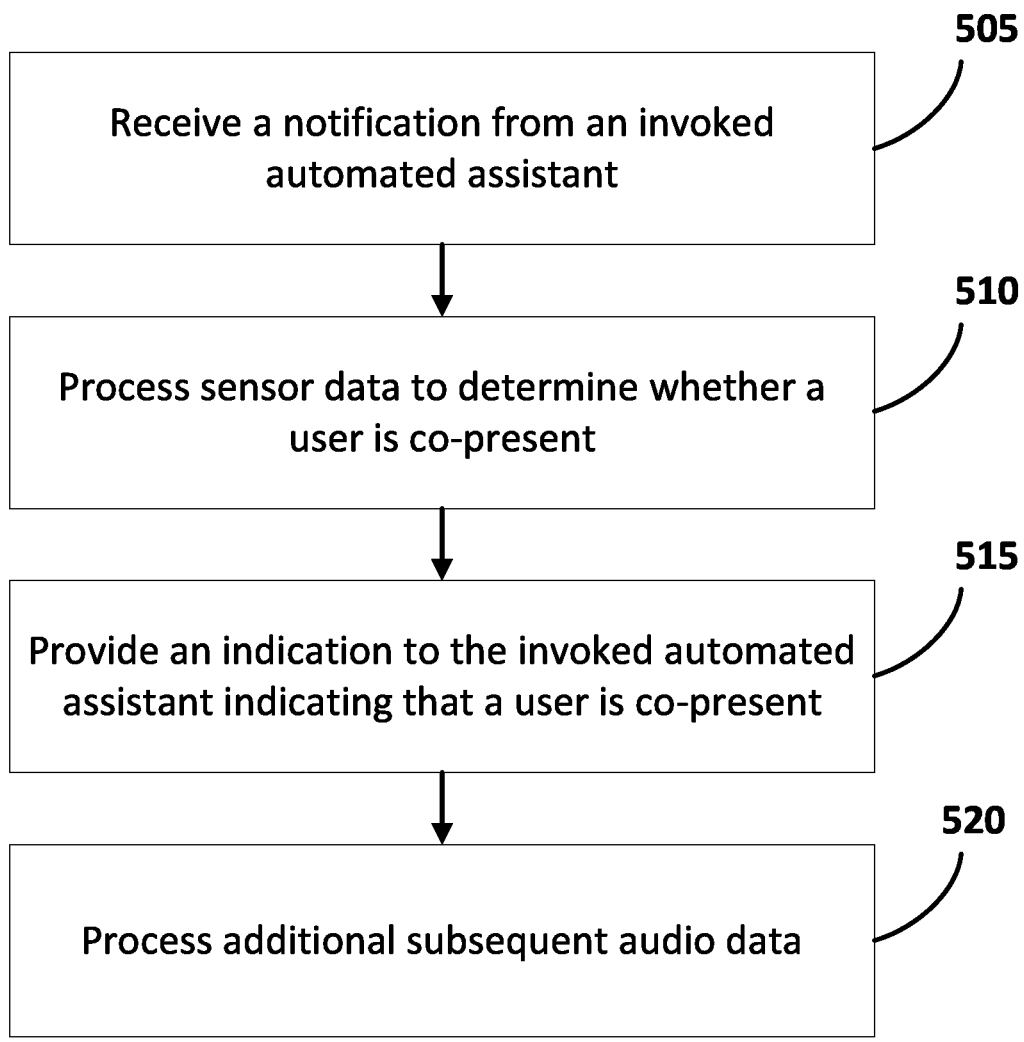
FIG. 5 is a flowchart illustrating an example method according to various implementations disclosed herein.

Referring to FIG. 5, a flowchart is provided that illustrates a method of determining whether to process subsequent audio data when a user is co-present with a device of an ecosystem of linked devices. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 505, a notification is received, by a non-invoked automated assistant and from an invoked automated assistant, indicating that subsequent audio data is likely to include a further assistant request. The notification can share one or more characteristics with the notification described previously with respect to step 430. For example, the notification can include a reference to and/or information related to a user profile of the user that uttered the invocation and/or initial request.

At step 510, sensor data of the device executing the automated assistant is processed to determine whether a user is co-present. Sensor data can include data generated by microphones, cameras, accelerometers, and/or other sensors as previously described with respect to sensors 105. In some implementations, co-presence can be determined by a component that shares one or more characteristics with co-presence monitor 130. Further, in some implementations, a component that shares one or more characteristics with speaker identification engine 140 can process limited audio data (and additionally or alternatively, visual data) to determine a profile of a user that is co-present with the device. For example, speaker identification engine 140 can process limited portions of audio data utilizing a text-independent speaker identification model, compare the output to an embedding of the user uttering one or more other phrases, and determine whether the user that uttered the one or more other phrases is the same as the user that is co-present (i.e., similarity between embeddings of the voice profiles are within a threshold). If it is determined that a user (or the user) is co-present, at step 515, an indication is provided to the invoked automated assistant to indicate that a user (or the user) is co-present. In response, the initially invoked automated assistant can cease to process subsequent audio data, as previously described. At step 520, the co-present automated assistant begins to process subsequent audio data, as previously described.

Figure 6A:
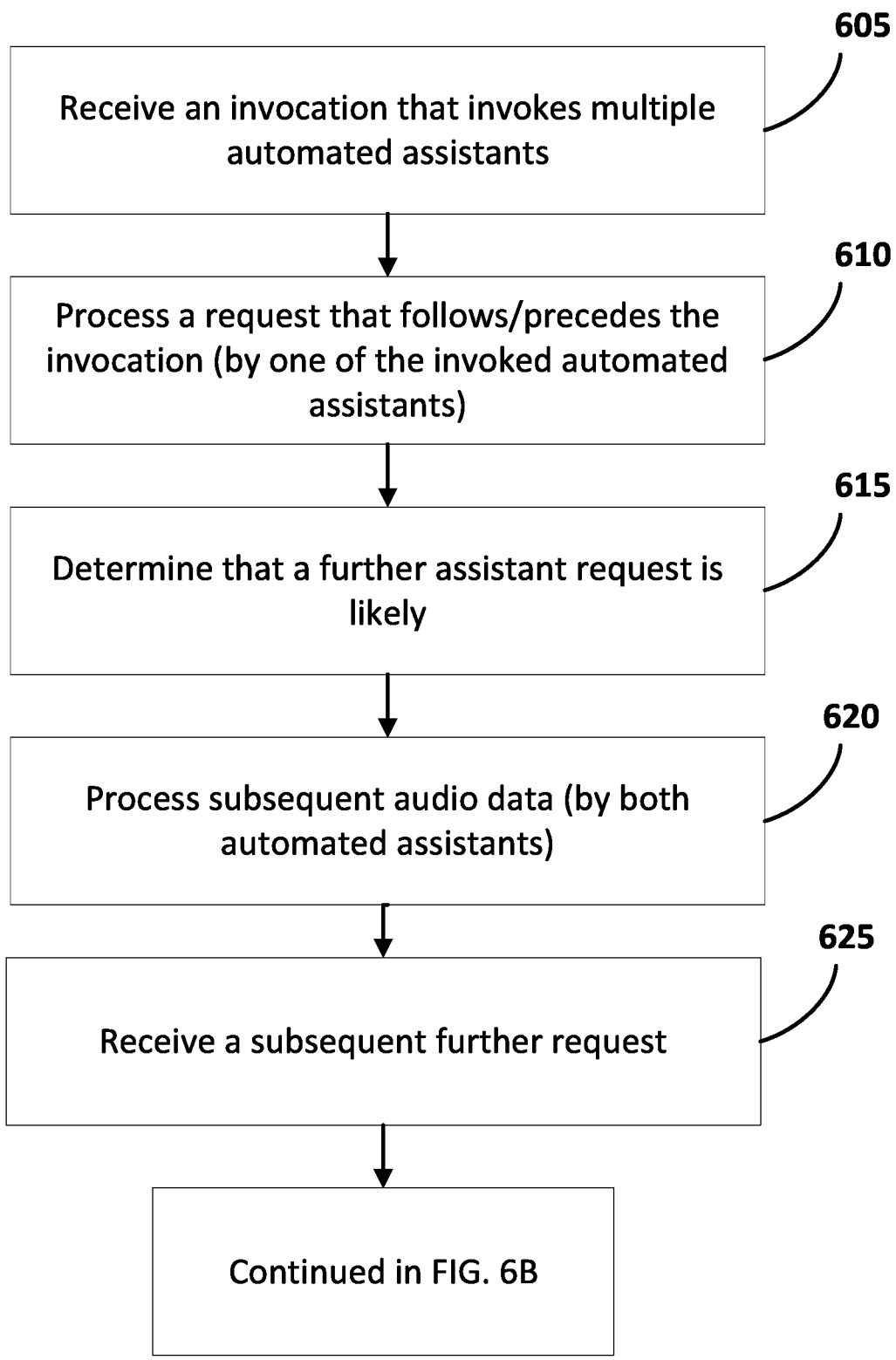
FIG. 6A and FIG. 6B is a flowchart illustrating an example method according to various implementations disclosed herein.
Figure 6B:
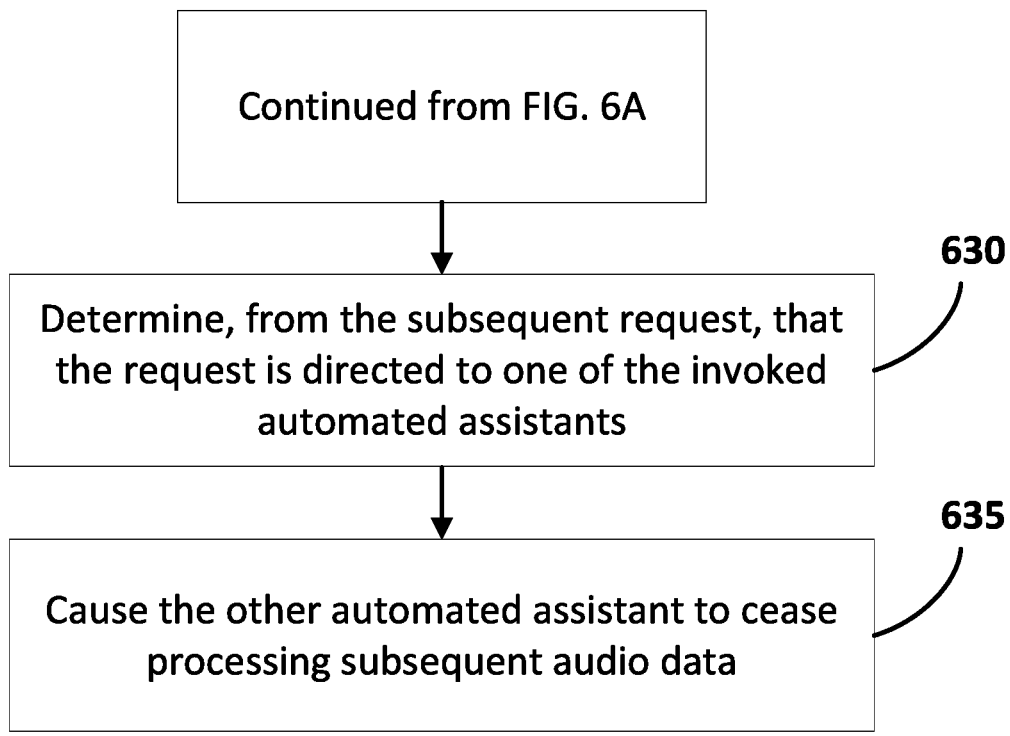

Referring to FIG. 6A-6B, a flowchart is provided that illustrates a method of determining whether to process subsequent audio data when a user is co-present with a device of an ecosystem of linked devices. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 605, an invocation is received that invokes multiple automated assistants. For example, a first automated assistant can be invoked with a phrase of "OK Assistant 1" and a second automated assistant can be invoked with an invocation phrase of "OK Assistant 2," and the user can utter an invocation of "OK Assistants," "OK Assistant 1 and Assistant 2," and/or another invocation phrase that can be recognized, by processing the audio data, by multiple automated assistants. In some implementations, the user may utter an invocation phrase that can invoke multiple assistants that are executing on the same device (e.g., "Assistant 1" can be, for example, automated assistant client 118 and "Assistant 2" can be automated assistant 120). In some implementations, the invoked automated assistants can be executing on separate devices. For example, the user may utter an invocation phrase of "OK Speaker 1 and Speaker 2" and/or "OK Speakers" and automated assistants executing on both "Speaker 1" and "Speaker 2" can be invoked by the phrase.

At step 610, a request is processed that follows and/or precedes the invocation. The request can be processed by one or more of the invoked automated assistants. For example, automated assistant client 118 can process, as previously described, audio data that precedes and/or follows the invocation, and second automated assistant 120 can process the audio data, each utilizing its separate components (e.g., ASR, NLP, STT). In some implementations, one or more of the automated assistants can perform one or more actions in response to the request that is included in the audio data.

At step 615, one of the automated assistants that processed the request determines that a further assistant request is likely. This step can share one or more characteristics with step 420 of FIG. 4A. For example, the user may activate a "continued conversation" mode that allows the user to utter a subsequent request without requiring the user to invoke the automated assistant a second time. Also, for example, a request can include one or more terms and/or be of a type that is likely to be followed up with an additional request. For example, the user may utter a request of "what is the weather today," and one or more of the invoked automated assistants can determine that the user is likely to follow the request with an additional request (e.g., "what about tomorrow").

At step 620, the invoked automated assistants process subsequent audio data. The processing can be performed by either or all of the automated assistants that were initially invoked. In some implementations, the automated assistants can process limited audio data to determine whether a request is included and only continue processing if the automated assistant determines that the audio data likely includes a request.

At step 625, a subsequent request is received. The subsequent request can be included in the subsequent audio data that is being processed by the automated assistants. For example, the user may utter "OK Assistants, what is the weather today," and "Assistant 1" can respond with "it is going to be 75 and sunny today." Both "Assistant 1" and "Assistant 2" can continue to process subsequent audio data to determine whether the user has provided an additional request. When the user utters "show me a weather map," the phrase can be processed by "Assistant 1" and "Assistant 2" to determine that the user has uttered a follow-up request.

At step 630, one of the automated assistants determines that the subsequent request is not directed to it but is instead directed at the other automated assistant. For example, the user can provide a request of "show me a weather map" as a follow-up request, and "Assistant 2" may be executing on a smart speaker that is not equipped with a visual display. Thus, for example, "Assistant 2" can determine that the follow-up request of "show me a weather map" is not directed to it. In response, at step 635, the automated assistant that is not the target of the subsequent request ceases to process subsequent audio data.

Figure 7:
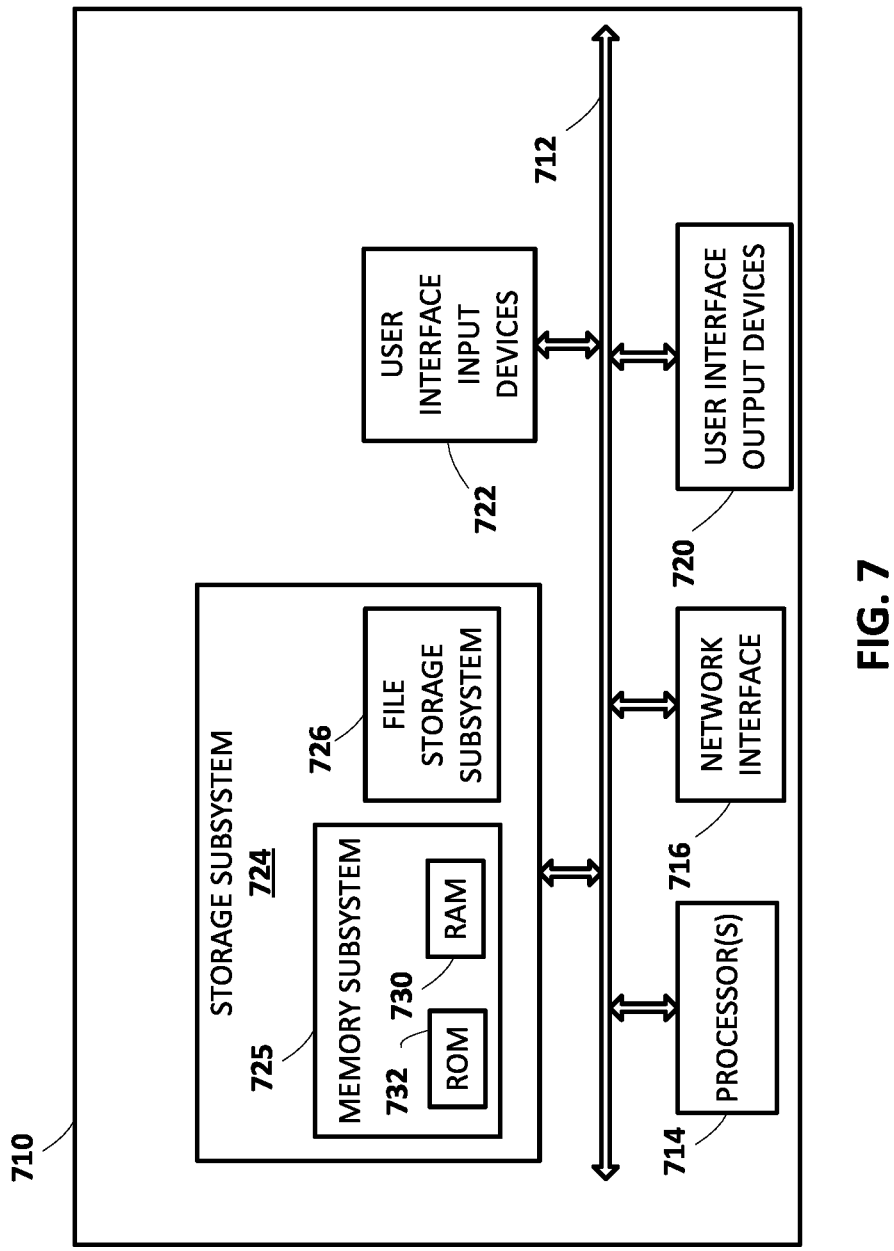
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIGS. 4-6, and/or to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method is disclosed and includes the steps of in response to determining that an invocation input, of a user, is intended for a first assistant device of an ecosystem of linked assistant devices: processing audio data that is captured via one or more first microphones of the first assistant device and that follows and/or precedes the invocation input; determining, based on processing the audio data, that an assistant request is included in a spoken utterance, of the user, that is captured by the audio data; causing performance of one or more actions that correspond to the assistant request; determining, based on the assistant request, that subsequent audio data is likely to include a further assistant request. In response to a continued assistant conversation mode being active and in response to determining that subsequent audio data is likely to include a further assistant request, the method further includes the steps of: processing subsequent audio data, captured via the first microphones of the first assistant device, to determine whether the subsequent audio data includes a further assistant request; and transmitting, to a plurality of additional assistant devices in the ecosystem of linked assistant devices, a notification that causes each of the additional assistant devices to temporarily process corresponding device-specific sensor data to determine whether the user is co-present with the additional assistant device. The method further includes the steps of: receiving, from a particular additional assistant device of the additional devices and prior to any determination that the subsequent audio data includes a further assistant request, an indication that the additional assistant device determined the user is co-present with the additional assistant device; and in response to receiving the indication: ceasing processing of the subsequent audio data captured via the first microphones of the first assistant device.

These and other implementations of the technology disclosed herein can include one or more of the following features.

In some implementations, the method further includes the steps of: determining a user identifier of the user; and providing the user identifier with the notification. In some of those implementations, determining the user identifier includes: processing the invocation input utilizing one or more text-dependent speaker verification models to generate a speaker profile; and identifying the user identifier based on an association between user and the speaker profile. In other of those implementations, determining the user identifier includes: processing the audio data utilizing one or more text-independent speaker verification models to generate a speaker profile; and identifying the user identifier based on an association between the user and the speaker profile.

In some implementations, the method further includes transmitting, to the particular additional device, context data generated based on the one or more actions, wherein the particular additional device utilizes the context data in determining whether the additional subsequent audio data includes a further assistant request and/or in processing a further assistant request included in the additional subsequent audio data.

In some implementations, the device-specific sensor data for at least one of the additional assistant devices includes sensor data generated by one or more of a microphone, an accelerometer, and/or a camera.

In other implementations, another method is disclosed and includes the steps of: receiving, from an invoked automated assistant executing on a first device in the ecosystem of linked assistant devices that also includes the client device, a notification that indicates that the invoked automated assistant is processing additional audio input, received via one or more microphones of the first device, to determine whether a further assistant request is included in the additional audio data; and processing, by an additional automated assistant executing on the client device, sensor data to determine whether a user is co-present with the client device, wherein the sensor data is generated by one or more sensors of the client device. In response to determining that a user is co-present with the client device, the method further includes: providing an indication, to the invoked automated assistant, that the additional automated assistant determined that the user is co-present with the client device, wherein providing the indication cases the invoked automated assistant to cease processing audio input; and processing additional subsequent audio data, captured via one or more microphones of the client device, in determining whether a further assistant request is included in the additional subsequent audio data.

These and other implementations of the technology disclosed herein can include one or more of the following features.

In some implementations, providing the indication causes the invoked automated assistant to cease processing subsequent audio data.

In some implementations, the method further includes: receiving an identifier of the user that invoked the automated assistant; determining, based on limited processing of the subsequent audio data and/or visual data, whether the co-present user is the user that invoked the automated assistant; and transmitting the notification only if the co-present user is identified as the user associated with the identifier. In some of those implementations, determining whether the co-present user is the user that invoked the automated assistant includes performing text dependent and/or text independent analysis of at least a portion of the subsequent audio data to generate an embedding, and the method further includes: comparing the embedding to a previously generated embedding that is associated with a profile of the user, wherein the profile is identified based on the identifier.

In some implementations, the method further includes: receiving, from the invoked automated assistant, contextual information related to one or more previous requests of the user and/or one or more responses to the user. In some of those implementations, the method further includes: processing the subsequent audio data, utilizing the contextual information, to determine one or more actions to perform in response to a subsequent request included in the subsequent audio data.

In some implementations, a system is disclosed and includes: a first assistant device and a second assistant device of an ecosystem of linked assistant devices, wherein the first assistant device is configured to: in response to determining that an invocation input, of a user, is intended for the first assistant device: process audio data that is captured via one or more first microphones of the first assistant device and that follows and/or precedes the invocation input; determine, based on processing the audio data, that an assistant request is included in a spoken utterance, of the user, that is captured by the audio data; cause performance of one or more actions that correspond to the assistant request; determine, based on the assistant request, that subsequent audio data is likely to include a further assistant request; in response to determining that subsequent audio data is likely to include a further assistant request, the first device is further configured to: process subsequent audio data, captured via the first microphones of the first assistant device, to determine whether the subsequent audio data includes a further assistant request; and transmit, to the second assistant device in the ecosystem of linked assistant devices, a notification that indicates subsequent audio data is likely to include a further assistant request. The second assistant device is configured to: process sensor data to determine whether a user is co-present with the second assistant device, wherein the sensor data is generated by one or more sensors of the second assistant device; in response to determining that a co-present user is co-present with the second assistant device: provide an indication, to the first assistant device, that co-present the user is co-present with the second assistant device, wherein providing the indication cases the first assistant device to cease processing audio input; and process additional subsequent audio data, captured via one or more microphones of the client device, in determining whether a further assistant request is included in the additional subsequent audio data.

These and other implementations of the technology disclosed herein can include one or more of the following features.

In some implementations, the first assistant device is further configured to: determine a user identifier of the user; and provide the user identifier to the second device, and the second assistant device is further configured to: determine, based on the user identifier and at least a portion of sensor data, whether the co-present user is the user; and provide the indication only if the co-present user is the user. In some of those implementations, in determining the user identifier, the first assistant device is further configured to: process the invocation input utilizing one or more text-dependent speech models to generate a speaker profile; and identify the user identifier based on an association between user and the speaker profile.

In some implementations, in determining the user identifier, the second assistant device is further configured to: process the audio data utilizing one or more text-independent speech models to generate a speaker profile; and identify the user identifier based on an association between the user and the speaker profile.

In some implementations, the sensor data includes visual data captured by one or more cameras of the second assistant device.

In some implementations, the first assistant device is further configured to: transmit, to the second assistant device, context data generated based on the one or more actions. In some of those implementations, the second assistant device is further configured to: determine, utilizing the context data, a further assistant request included in the additional subsequent audio data.

In some implementations, the first assistant device and the second assistant device are both executing instances of a same automated assistant in conjunction with one or more shared cloud-based components.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method, implemented by one or more processors, comprising:
 in response to determining that an invocation input, of a user, is intended for a first assistant device of an ecosystem of linked assistant devices:
  processing audio data that is captured via one or more first microphones of the first assistant device and that follows and/or precedes the invocation input;
  determining, based on processing the audio data, that an assistant request is included in a spoken utterance, of the user, that is captured by the audio data;
  causing performance of one or more actions that correspond to the assistant request;
  determining, based on the assistant request, that subsequent audio data is likely to include a further assistant request;

in response to a continued assistant conversation mode being active and in response to determining that subsequent audio data is likely to include a further assistant request:
   processing subsequent audio data, captured via the first microphones of the first assistant device, to determine whether the subsequent audio data includes a further assistant request; and
   transmitting, to a plurality of additional assistant devices in the ecosystem of linked assistant devices, a notification that causes each of the additional assistant devices to temporarily process corresponding device-specific sensor data to determine whether the user is co-present with the additional assistant device;
receiving, from a particular additional assistant device of the additional devices and prior to any determination that the subsequent audio data includes a further assistant request, an indication that the additional assistant device determined the user is co-present with the additional assistant device; and
in response to receiving the indication:
   ceasing processing of the subsequent audio data captured via the first microphones of the first assistant device.

2. The method of claim 1, further comprising:
determining a user identifier of the user; and
providing the user identifier with the notification.

3. The method of claim 2, wherein determining the user identifier includes:
   processing the invocation input utilizing one or more text-dependent speaker verification models to generate a speaker profile; and
   identifying the user identifier based on an association between the user and the speaker profile.

4. The method of claim 2, wherein determining the user identifier includes:
   processing the audio data utilizing one or more text-independent speaker verification models to generate a speaker profile; and
   identifying the user identifier based on an association between the user and the speaker profile.

5. The method of claim 1, further comprising:
transmitting, to the particular additional device, context data generated based on the one or more actions, wherein the particular additional device utilizes the context data in determining whether the additional subsequent audio data includes a further assistant request and/or in processing a further assistant request included in the additional subsequent audio data.

6. The method of claim 1, wherein the device-specific sensor data for at least one of the additional assistant devices includes sensor data generated by one or more of a microphone, an accelerometer, and/or a camera.

7. A system, comprising:
a first assistant device and a second assistant device of an ecosystem of linked assistant devices, wherein the first assistant device is configured to:
   in response to determining that an invocation input, of a user, is intended for the first assistant device:
      process audio data that is captured via one or more first microphones of the first assistant device and that follows and/or precedes the invocation input;
      determine, based on processing the audio data, that an assistant request is included in a spoken utterance, of the user, that is captured by the audio data;
      cause performance of one or more actions that correspond to the assistant request;
      determine, based on the assistant request, that subsequent audio data is likely to include a further assistant request;
   in response to determining that subsequent audio data is likely to include a further assistant request:
      process subsequent audio data, captured via the first microphones of the first assistant device, to determine whether the subsequent audio data includes a further assistant request; and
      transmit, to the second assistant device in the ecosystem of linked assistant devices, a notification that indicates subsequent audio data is likely to include a further assistant request; and
wherein the second assistant device is configured to:
process sensor data to determine whether a user is co-present with the second assistant device, wherein the sensor data is generated by one or more sensors of the second assistant device;
in response to determining that a co-present user is co-present with the second assistant device:
   provide an indication, to the first assistant device, that co-present the user is co-present with the second assistant device, wherein providing the indication causes the first assistant device to cease processing audio input; and
   process additional subsequent audio data, captured via one or more microphones of the client device, in determining whether a further assistant request is included in the additional subsequent audio data.

8. The system of claim 7, wherein the first assistant device is further configured to:
determine a user identifier of the user; and
provide the user identifier to the second device, and wherein the second assistant device is further configured to:
determine, based on the user identifier and at least a portion of sensor data, whether the co-present user is the user; and
provide the indication only if the co-present user is the user.

9. The system of claim 8, wherein in determining the user identifier, the first assistant device is further configured to:
process the invocation input utilizing one or more text-dependent speech models to generate a speaker profile; and
identify the user identifier based on an association between the user and the speaker profile.

10. The system of claim 8, wherein in determining the user identifier, the second assistant device is further configured to:
process the audio data utilizing one or more text-independent speech models to generate a speaker profile; and
identify the user identifier based on an association between the user and the speaker profile.

11. The system of claim 7, wherein the sensor data includes visual data captured by one or more cameras of the second assistant device.

12. The system of claim 7, wherein the first assistant device is further configured to:
transmit, to the second assistant device, context data generated based on the one or more actions.

13. The system of claim 12, wherein the second assistant device is further configured to:

determine, utilizing the context data, a further assistant request included in the additional subsequent audio data.

14. The system of claim 7, wherein the first assistant device and the second assistant device are both executing instances of a same automated assistant in conjunction with one or more shared cloud-based components.

15. At least one non-transitory computer-readable medium comprising instructions that, in response to execution of the instructions by one or more processors, cause one or more of the processors to:
in response to determining that an invocation input, of a user, is intended for a first assistant device of an ecosystem of linked assistant devices:
process audio data that is captured via one or more first microphones of the first assistant device and that follows and/or precedes the invocation input;
determine, based on processing the audio data, that an assistant request is included in a spoken utterance, of the user, that is captured by the audio data;
cause performance of one or more actions that correspond to the assistant request; and
determine, based on the assistant request, that subsequent audio data is likely to include a further assistant request;
in response to a continued assistant conversation mode being active and in response to determining that subsequent audio data is likely to include a further assistant request:
process subsequent audio data, captured via the first microphones of the first assistant device, to determine whether the subsequent audio data includes a further assistant request; and
transmit, to a plurality of additional assistant devices in the ecosystem of linked assistant devices, a notification that causes each of the additional assistant devices to temporarily process corresponding device-specific sensor data to determine whether the user is co-present with the additional assistant device;
receive, from a particular additional assistant device of the additional devices and prior to any determination that the subsequent audio data includes a further assistant request, an indication that the additional assistant device determined the user is co-present with the additional assistant device; and
in response to receiving the indication:
cease processing of the subsequent audio data captured via the first microphones of the first assistant device.

16. The at least one non-transitory computer-readable medium of claim 15, wherein, in response to execution of the instructions by one or more of the processors, one or more of the processors are further to:
determine a user identifier of the user; and
provide the user identifier with the notification.

17. The at least one non-transitory computer-readable medium of claim 16, wherein in determining the user identifier one or more of the processors are to:
process the invocation input utilizing one or more text-dependent speaker verification models to generate a speaker profile; and
identify the user identifier based on an association between the user and the speaker profile.

18. The at least one non-transitory computer-readable medium of claim 16, wherein in determining the user identifier one or more of the processors are to:
process the audio data utilizing one or more text-independent speaker verification models to generate a speaker profile; and
identify the user identifier based on an association between the user and the speaker profile.

19. The at least one non-transitory computer-readable medium of claim 15, wherein, in response to execution of the instructions by one or more of the processors, one or more of the processors are further to:
transmit, to the particular additional device, context data generated based on the one or more actions, wherein the particular additional device utilizes the context data in determining whether the additional subsequent audio data includes a further assistant request and/or in processing a further assistant request included in the additional subsequent audio data.

* * * * *